US012781787B2

(12) United States Patent
Carper et al.

(10) Patent No.: US 12,781,787 B2
(45) Date of Patent: Nov. 3, 2026

(54) FASTENER FOR ENGAGING THREADED OPENINGS

(71) Applicant: Raytheon Company, Waltham, MA (US)

(72) Inventors: Brent Carper, Tucson, AZ (US); Eric P. Huelsmann, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 266 days.

(21) Appl. No.: 18/203,362

(22) Filed: May 30, 2023

(65) Prior Publication Data

US 2024/0167496 A1 May 23, 2024

Related U.S. Application Data

(60) Provisional application No. 63/427,328, filed on Nov. 22, 2022.

(51) Int. Cl.
*F16B 35/02* (2006.01)
*F16B 35/04* (2006.01)
*F16B 35/06* (2006.01)

(52) U.S. Cl.
CPC ............ *F16B 35/041* (2013.01); *F16B 35/02* (2013.01); *F16B 35/06* (2013.01)

(58) Field of Classification Search
CPC ........ F16B 35/041; F16B 35/06; F16B 35/02; F16B 19/109; F16B 39/023
(Continued)

(56) References Cited

U.S. PATENT DOCUMENTS 2,381,050 A * 8/1945 Hardinge ............ A61B 17/742 606/68
3,158,059 A 11/1964 Myers
(Continued)

FOREIGN PATENT DOCUMENTS

CN 108194484 A * 6/2018
CN 110332200 A * 10/2019
(Continued)

OTHER PUBLICATIONS

International Search Report and Written Opinion from PCT Application Serial No. PCT/US2023/078638, dated Feb. 12, 2024, 11 pages.

*Primary Examiner* — Kristina R Fulton
*Assistant Examiner* — Jock Wong
(74) *Attorney, Agent, or Firm* — Kinney & Lange, P.A.

(57) ABSTRACT

A fastener for engaging a threaded opening includes two shaft elements extending from a cap end to a shaft end and having a partially cylindrical shape, an internal alignment shaft surrounded by a central cavity, a releasable constriction mechanism, a releasable expansion mechanism, and a cap which can engage the cap ends of the shaft elements such that the shaft elements move relative to the internal alignment shaft. At least a portion of at least one shaft end includes external threads. The shaft elements are oriented about the central cavity and the central cavity is defined by internal surfaces of the shaft elements. The releasable constriction mechanism can constrict about the shaft elements such that the shaft elements move inward toward the internal alignment shaft. The releasable expansion mechanism can allow the shaft elements to move away from the internal alignment shaft.

19 Claims, 10 Drawing Sheets

(58) Field of Classification Search
USPC .... 411/385, 44–52, 347, 271, 325, 383, 954
See application file for complete search history.

(56) References Cited

U.S. PATENT DOCUMENTS

| | | | | | |
|---|---|---|---|---|---|
| 3,159,075 | A * | 12/1964 | Bjork | F16B 35/02 411/383 |
| 3,266,364 | A | 8/1966 | Becker | |
| 3,943,817 | A * | 3/1976 | Mess | F16B 35/02 411/434 |
| 4,488,843 | A | 12/1984 | Achille | |
| 4,671,718 | A * | 6/1987 | Eakin | B21J 15/42 81/177.85 |
| 4,915,343 | A | 4/1990 | Terlecke | |
| 5,123,794 | A * | 6/1992 | Pire | F42B 3/006 411/383 |
| 5,244,323 | A | 9/1993 | Tucchio | |
| 5,634,754 | A * | 6/1997 | Weddendorf | F16B 35/02 411/383 |
| 5,755,543 | A * | 5/1998 | Culpen | F16B 35/02 411/419 |
| 5,788,443 | A * | 8/1998 | Cabahug | F16B 37/0857 411/385 |
| 6,076,437 | A * | 6/2000 | Saint Martin | F16B 39/30 470/9 |
| 6,668,688 | B2 | 12/2003 | Zhao et al. | |
| 7,165,924 | B1 | 1/2007 | Breslin et al. | |
| 10,124,449 | B2 | 11/2018 | Branyon et al. | |
| 11,389,303 | B1 | 7/2022 | Mcguire et al. | |
| 2008/0230973 | A1* | 9/2008 | Miyazaki | B23Q 3/082 269/309 |
| 2011/0110746 | A1* | 5/2011 | Smith | F16B 35/02 411/433 |
| 2018/0080492 | A1* | 3/2018 | Chang | F16B 35/02 |
| 2019/0078606 | A1* | 3/2019 | Shehab | F16B 39/023 |
| 2021/0131478 | A1* | 5/2021 | Halder | F16B 45/002 |
| 2022/0211471 | A1 | 7/2022 | De Andres Zurbano et al. | |

FOREIGN PATENT DOCUMENTS

| | | | |
|---|---|---|---|
| EP | 2206470 | A3 | 1/2011 |
| JP | 3428473 | B2 * | 7/2003 |

* cited by examiner

FASTENER FOR ENGAGING THREADED OPENINGS

CROSS-REFERENCE TO RELATED APPLICATION(S)

This application claims the benefit of U.S. Provisional Application No. 63/427,328 filed Nov. 22, 2022 for "FASTENER FOR ENGAGING THREADED OPENINGS" by B. Carper and E. P. Huelsmann.

BACKGROUND

The present disclosure relates generally to fasteners and specifically to a fastener which can engage threaded openings.

Fasteners, such as screws or temporary rivets, are frequently used in manufacturing to align and hold workpieces, such as metal panels, together. However, repeatedly inserting and removing threaded fasteners by rotating them within threaded openings can degrade the threads both on the fastener and within the opening. Conventional non-rotational fasteners often require openings to be sized to the fastener and may not be compatible with all types of openings. Repeated rotation of the fasteners can fatigue the material of the workpieces and, in more extreme examples, can cause ergonomic injuries due to repetitive motions.

SUMMARY

A fastener for engaging a threaded opening includes first and second shaft elements, an internal alignment shaft, a releasable constriction mechanism, a releasable expansion mechanism, and a cap. The first shaft element extends along a shaft axis from a first cap end to a first shaft end and has a partially cylindrical shape. The second shaft element extends along the shaft axis from a second cap end to a second shaft end and has a partially cylindrical shape. The second shaft element is disposed alongside and parallel the first shaft element. The internal alignment shaft extends along the shaft axis and is surrounded by a central cavity. The first shaft element and the second shaft element are oriented about the central cavity and the central cavity is defined by a first internal surface of the first shaft element and a second internal surface of the second shaft element. The releasable constriction mechanism is configured to constrict about the first shaft element and the second shaft element such that the first shaft element and the second shaft element move laterally inward toward the internal alignment shaft. The releasable expansion mechanism is configured to allow the first shaft element and the second shaft element to move laterally outward away from the internal alignment shaft. The cap is configured to move axially along the shaft axis, and is configured to engage the first cap end of the first shaft element and the second cap end of the second shaft element such that the first shaft element and the second shaft element move axially relative to the internal alignment shaft. At least a portion of at least one of the first shaft end and the second shaft end comprises external threads.

As further discussed herein, a fastener for engaging a threaded opening includes first and second shaft elements, an internal alignment shaft, at least one radial spring, at least one compression spring, a cap, and a housing. The first shaft element extends along a shaft axis from a first cap end to a first threaded end and has a partially cylindrical shape. At least a portion of the first threaded end comprises external threads. The second shaft element extends along the shaft axis from a second cap end to a second threaded end and has a partially cylindrical shape. At least a portion of the second threaded end comprises external threads. The second shaft element is disposed alongside and parallel the first shaft element. The internal alignment shaft extends along the shaft axis and is surrounded by a central cavity. The first shaft element and the second shaft element are oriented about the central cavity and the central cavity is defined by a first internal surface of the first shaft element and a second internal surface of the second shaft element. The at least one radial spring is configured to constrict about the first shaft element and the second shaft element such that the first shaft element and the second shaft element move laterally inward toward the internal alignment shaft. The at least one compression spring is configured to allow the first shaft element and the second shaft element to move laterally outward away from the internal alignment shaft. The cap is configured to move axially along the shaft axis, and is configured to engage the first cap end of the first shaft element and the second cap end of the second shaft element such that the first shaft element and the second shaft element move axially relative to the internal alignment shaft. The housing surrounds the first cap end and the second cap end, extends along the shaft axis to the first threaded end and the second threaded end, and is configured to receive the cap.

As also discussed herein, a method of fastening a first workpiece to a second workpiece includes depressing a cap of a fastener, thereby engaging a first cap end of a first shaft element of the fastener and a second cap end of a second shaft element of the fastener. The first shaft element extends from the first cap end to a first shaft end and has a partially cylindrical shape. The second shaft element extends from the second cap end to a second shaft end and has a partially cylindrical shape, and is disposed alongside and parallel the first shaft element. At least a portion of at least one of the first shaft end and the second shaft end comprise external threads. The first shaft element and the second shaft element move along tapered sections of an internal alignment shaft of the fastener. The tapered sections guide the movement of the first shaft element and the second shaft element both laterally and axially relative to the internal alignment shaft with respect to a shaft axis along which the first shaft element, the second shaft element, and the internal alignment shaft extend. A releasable constriction mechanism constricts the first shaft element and the second shaft element such that the first shaft element and the second shaft element move laterally inward toward the internal alignment shaft, guided by the tapered sections of the internal alignment shaft. The first shaft end and the second shaft end are inserted through a first opening of the first workpiece and into a second opening of the second workpiece which is situated adjacent to the first opening. The cap is released, thereby disengaging the first cap end and the second cap end. A releasable expansion mechanism allows the first shaft element to move laterally apart from the second shaft element guided by the tapered sections of the internal alignment shaft. The at least a portion of at least one of the first shaft end and the second shaft end comprising external threads engages threads within the second opening.

The present summary is provided only by way of example, and not limitation. Other aspects of the present disclosure will be appreciated in view of the entirety of the present disclosure, including the entire text, claims, and accompanying figures.

Figure 1A:
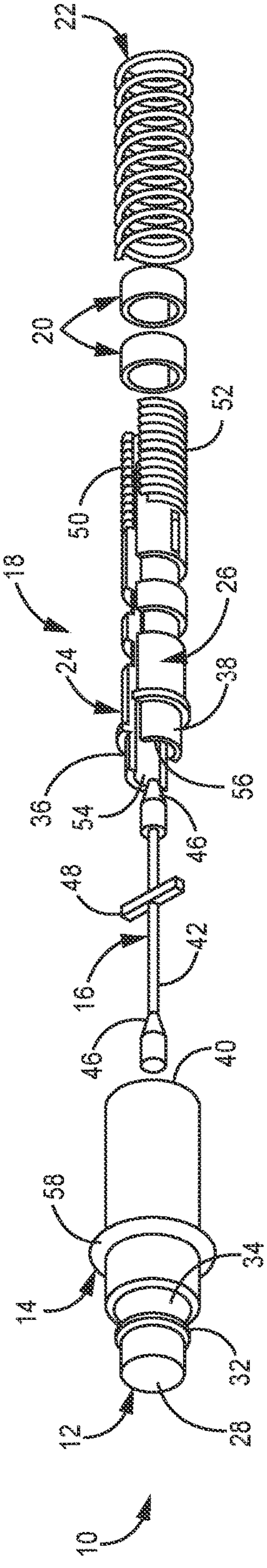
FIG. 1A is an exploded view of a fastener.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A fastener is presented herein that can engage female threads without requiring rotation to be inserted into a threaded opening, preventing wear on the threads. The fastener includes two or more threaded shaft elements which can be compressed for insertion into the opening, and then allowed to expand to fit the opening and engage the threads. The fastener also includes an internal alignment shaft with tapered sections which guide the movement of the threaded shaft elements relative to the internal alignment shaft.

Figure 1D:
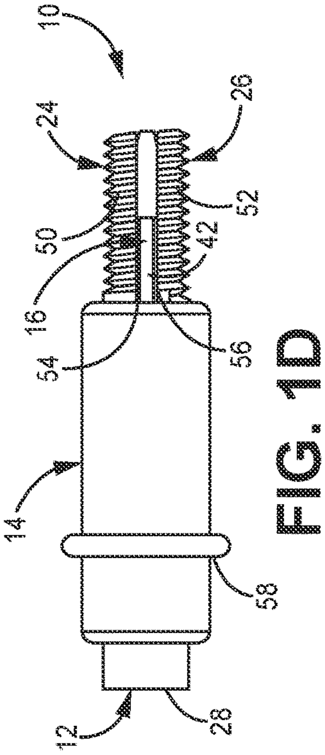
FIG. 1D is a side view of the fastener of FIG. 1A.
Figure 1E:
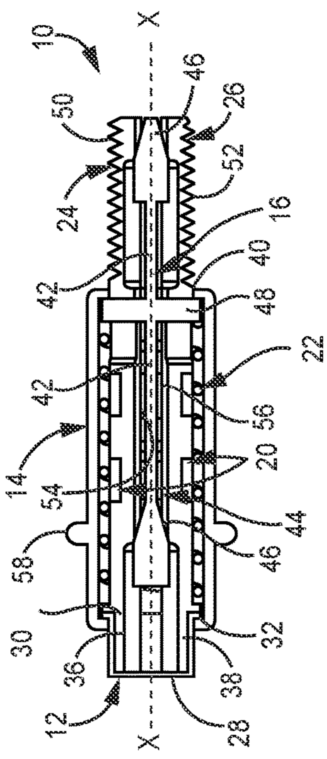
FIG. 1E is a cross-sectional view of the fastener of FIG. 1A along line A-A shown in FIG. 1C.
Figure 1C:
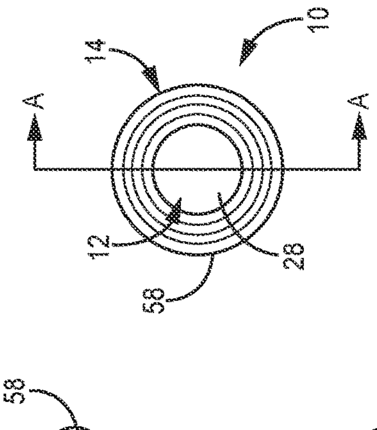
FIG. 1C is a top plan view of the fastener of FIG. 1A.
Figure 1B:
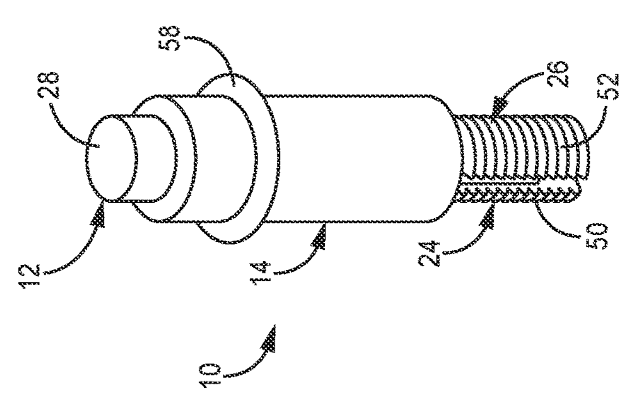
FIG. 1B is a perspective view of the fastener of FIG. 1A.

FIG. 1A is an exploded view of fastener 10. Fastener 10 includes cap 12, housing 14, internal alignment shaft 16, threaded shaft section 18, radial springs 20, and compression spring 22. Threaded shaft section 18 includes first shaft element 24 and second shaft element 26. FIG. 1B is a perspective view of fastener 10. FIG. 1C is a top plan view of fastener 10. FIG. 1D is a side view of fastener 10. FIG. 1E is a cross-sectional view of fastener 10 along line A-A shown in FIG. 1C. FIGS. 1A-1E will be discussed concurrently.

Cap 12 can have an approximate cylindrical shape and can be substantially hollow. In the example shown in FIGS. 1A-1E, cap 12 extends from closed end 28 to open end 30 and includes cap lip 32 at or adjacent open end 30, such that open end 30 (shown in FIG. 1E) has a diameter which is larger than the cap opening 34 formed in housing 14 through which closed end 28 extends. Housing 14 can surround first cap end 36 of first shaft element 24 and second cap end 38 of second shaft element 26, and can be approximately cylindrical in shape and substantially hollow. Housing 14 can extend along shaft axis X-X (shown in FIG. 1E) from cap 12 to threaded shaft section 18, and can define cap opening 34 and shaft opening 40. Central body 42 of internal alignment shaft 16 extends along shaft axis X-X and is surrounded by central cavity 44 (shown in FIG. 1E). Central cavity 44 separates first shaft element 24 and second shaft element 26 from central body 42. In the example shown in FIGS. 1A-1E, internal alignment shaft 16 includes tapered sections 46 oriented along central body 42. Tapered sections 46 can be approximately conical in shape. Internal alignment shaft 16 can additionally include cross bar 48, which can be oriented perpendicular to central body 42. Threaded shaft section 18 includes first shaft element 24, which extends along shaft axis X-X from first cap end 36 to first shaft end 50, and second shaft element 26, which extends along shaft axis X-X from second cap end 38 to second shaft end 52. Both first shaft element 24 and second shaft element 26 have an approximately partially cylindrical shape. At least a portion of at least one of first shaft end 50 and second shaft end 52 includes external threads. In some examples, a portion of first shaft end 50 and/or second shaft end 52 include an unthreaded (i.e., smooth) external surface. First shaft element 24 and second shaft element 26 are oriented about central cavity 44, and central cavity 44 is defined by first internal surface 54 of first shaft element 24 and second internal surface 56 of second shaft element 26. Radial springs 20 are situated radially outward from first shaft element 24 and second shaft element 26 with respect to shaft axis X-X. Compression spring 22 is situated radially outward from radial springs 20 with respect to shaft axis X-X.

Cap 12 can be configured to move axially along shaft axis X-X, and can be configured to engage first cap end 36 and second cap end 38. Housing 14 can be configured to receive cap 12 through cap opening 34. Cap 12 and housing 14 can be configured to be actuated by hand and/or with tools such as pliers. In particular, cap 12 and housing 14 can be configured to be actuated by a deco-style plier which can interface with housing lip 58 and closed end 28 of cap 12 to depress cap 12 into housing 14. Tapered sections 46 of internal alignment shaft 16 guide the lateral movement of first shaft element 24 and second shaft element 26 relative to central body 42 of internal alignment shaft 16. Radial springs 20 can be configured to constrict about first shaft element 24 and second shaft element 26 such that first shaft element 24 and second shaft element 26 move laterally inward toward central body 42 of internal alignment shaft 16. Compression spring 22 can be configured to allow first shaft element 24 and second shaft element 26 to move laterally outward away from central body 42 of internal alignment shaft 16.

First shaft element 24 and second shaft element 26 can be oriented relative to each other such that second shaft element 26 is disposed alongside and parallel first shaft element 24. In some examples, first shaft element 24 and second shaft element 26 can be approximately the same size and/or can be approximately hemicylindrical in shape. In other examples, first shaft element 24 and second shaft element 26 can be asymmetric, such that first shaft element 24 is larger or smaller than second shaft element 26 and/or makes up a greater or lesser percentage of threaded shaft section 18 than second shaft element 26. In some examples, first shaft element 24 and/or second shaft element 26 can have a uniform partially cylindrical cross section along the length of first shaft element 24 and/or second shaft element 26. In other examples, a portion of first shaft element 24 and/or second shaft element 26 has a partially cylindrical cross section (for example, at first shaft end 50 and/or second shaft end 52), and another portion of first shaft element 24 and/or second shaft element 26 has a non-partially cylindrical cross section (such as a concave, flattened, and/or truncated shape).

As described in more detail below with respect to FIGS. 2A-3, a fastener such as fastener 10 can be used to fasten two or more workpieces together by engaging threaded openings. Fastener 10 can be used as a temporary fastener for measurement/fitting purposes, and can be reused without significant degradation of the threads both on the surface of fastener 10 and within the openings in the workpieces. More generally, fastener 10 is able to engage and disengage from threading without significantly impairing future usability, e.g. when reinstalled or installed at a new location.

Figure 2A:
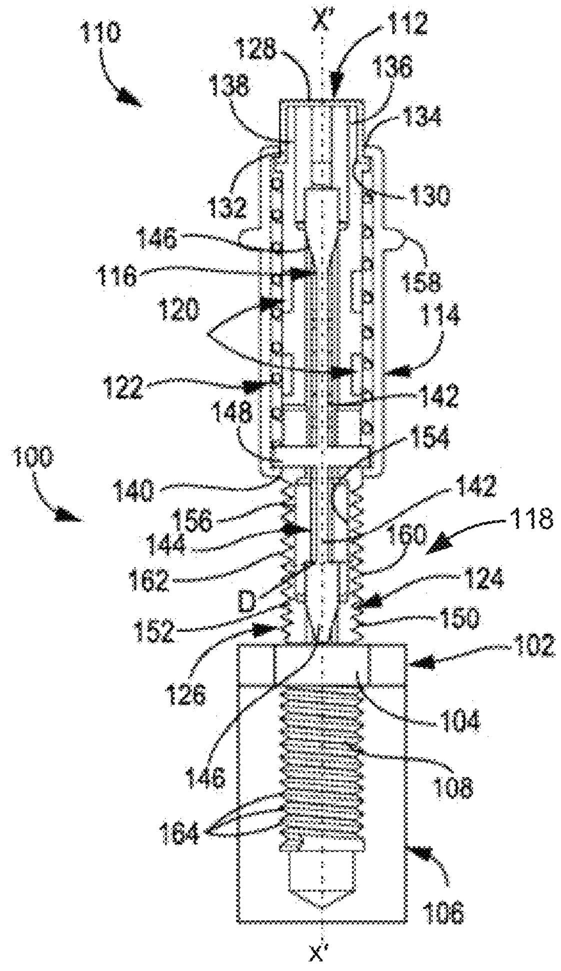
FIG. 2A is a cross-sectional view of a fastener adjacent to a threaded opening.
Figure 2B:
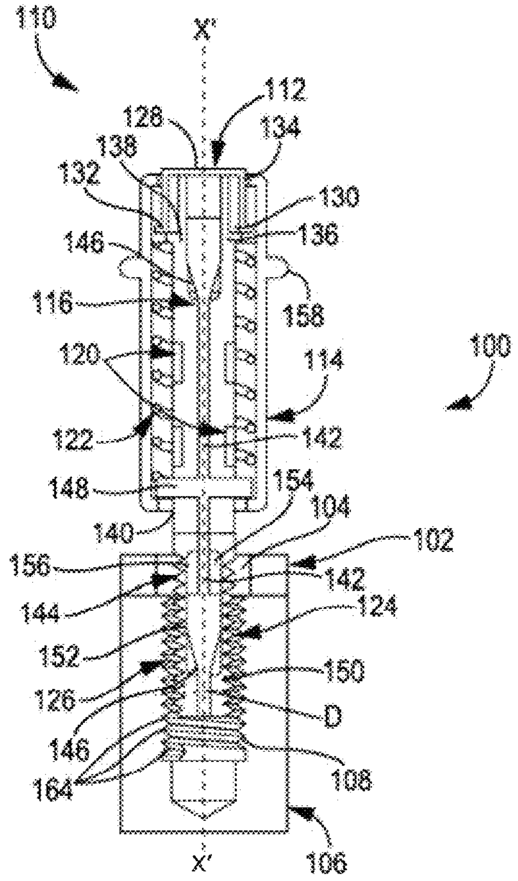
FIG. 2B is a cross-sectional view of the fastener of FIG. 2A with the cap depressed.
Figure 2C:
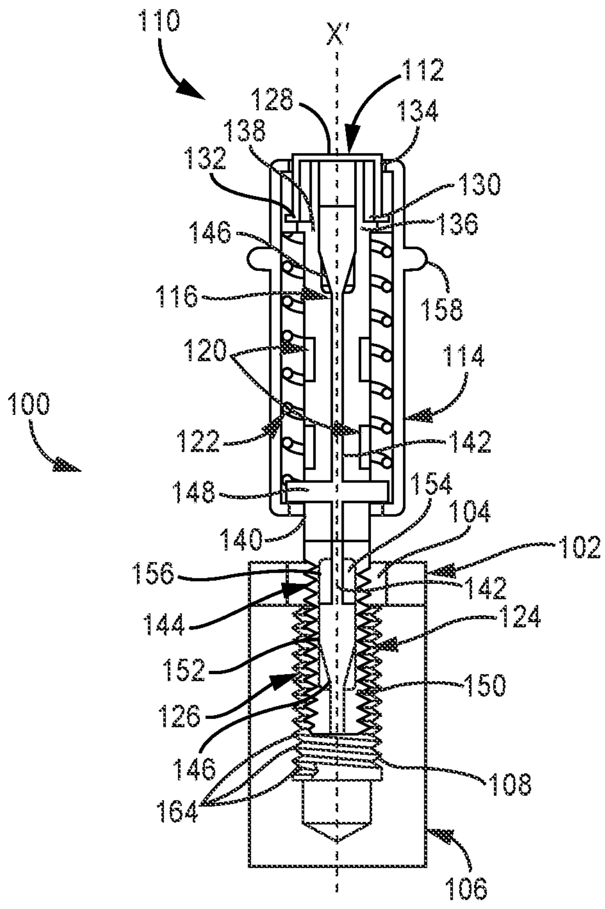
FIG. 2C is a cross-sectional view of the fastener of FIG. 2B inserted into the threaded opening.
Figure 2D:
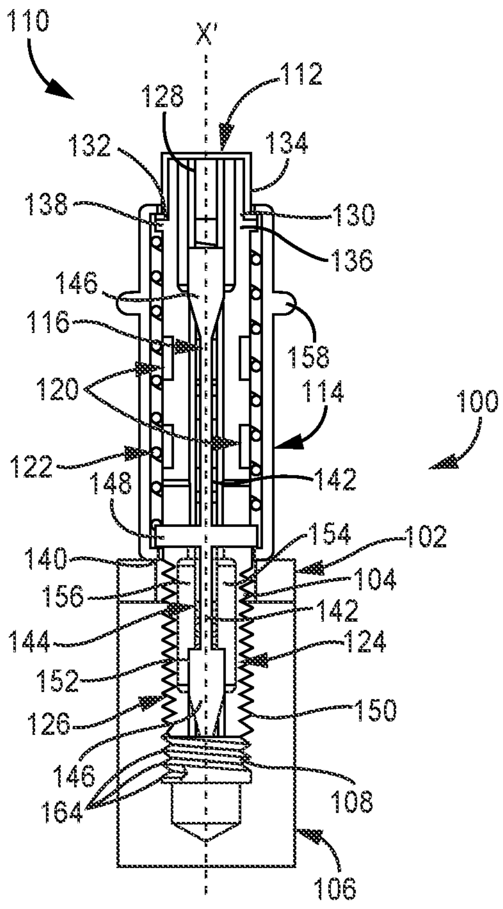
FIG. 2D is a cross-sectional view of the fastener of FIG. 2C with the cap released.
Figure 3:
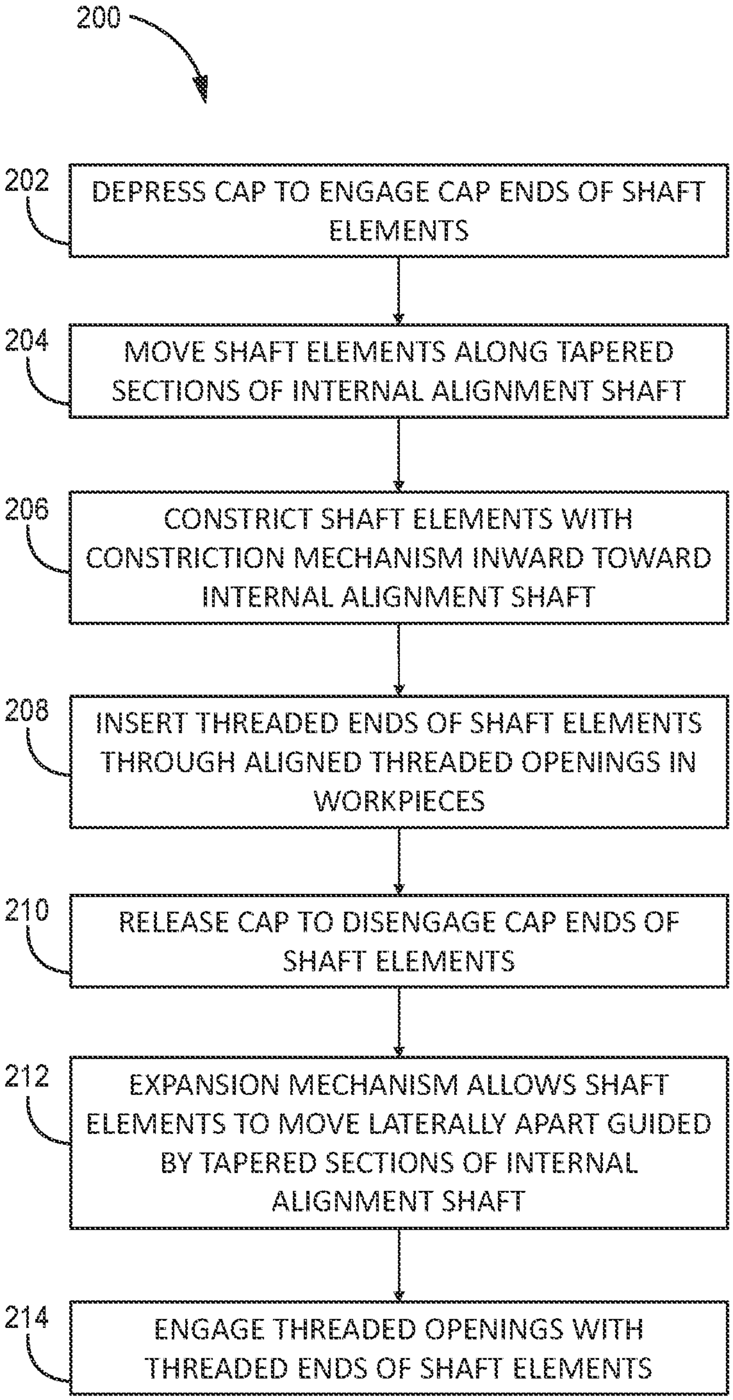
FIG. 3 depicts a method of fastening two workpieces with a fastener.

FIG. 2A is a cross-sectional view of fastening system 100. Fastening system 100 includes first workpiece 102 with first opening 104, second workpiece 106 with second opening 108, and fastener 110. Fastener 110 includes cap 112, housing 114, internal alignment shaft 116, threaded shaft section 118, releasable constriction mechanism 120, and releasable expansion mechanism 122. Threaded shaft section 118 includes first shaft element 124 and second shaft element 126. FIG. 2B is a cross-sectional view of fastening system 100 with cap 112 of fastener 110 depressed. FIG. 2C is a cross-sectional view of fastening system 100 with fastener 110 inserted through first opening 104 and into second opening 108. FIG. 2D is a cross-sectional view of fastening system 100 with cap 112 released. FIG. 3 depicts method 200 of fastening two workpieces with a fastener (such as fasteners 10, 110). Method 200 includes steps 202-206 (illustrated by FIGS. 2A-2B), 208 (illustrated by FIG. 2B), 210 (illustrated by FIG. 2C), and 212-214 (illustrated by FIG. 2D). FIG. 3 will be discussed alongside FIGS. 2A-2D in turn below. While method 200 is discussed below in relation to fastener 110, it should be understood that method 200 can be similarly performed with fasteners such as fasteners 10, 310, 410, 510. With respect to fastener 310, as described further below, threaded end 322 will engage threads within an opening.

Similar to cap 12, cap 112 can have an approximate cylindrical shape and can be substantially hollow. In the example shown in FIGS. 2A-2D, cap 112 extends from closed end 128 to open end 130 and includes cap lip 132 at or adjacent open end 130, such that open end 130 has a diameter which is larger than the cap opening 134 formed in housing 114 through which closed end 128 extends. Housing 114 can surround first cap end 136 of first shaft element 124 and second cap end 138 of second shaft element 126, and can be approximately cylindrical in shape and substantially hollow. Housing 114 can extend along shaft axis X'-X' from cap 112 to threaded shaft section 118, and can define cap opening 134 and shaft opening 140. Central body 142 of internal alignment shaft 116 extends along shaft axis X'-X' and is surrounded by central cavity 144. Central cavity 144 separates first shaft element 124 and second shaft element 126 from central body 142. In the example shown in FIGS. 2A-2D, internal alignment shaft 116 includes tapered sections 146 oriented along central body 142. Tapered sections 146 can be approximately conical in shape. Internal alignment shaft 116 can additionally include cross bar 148, which can be oriented perpendicular to central body 142. Threaded shaft section 118 includes first shaft element 124, which extends along shaft axis X'-X' from first cap end 136 to first threaded end 150, and second shaft element 126, which extends along shaft axis X'-X' from second cap end 138 to second threaded end 152. Both first shaft element 124 and second shaft element 126 have an approximately partially cylindrical shape. In the example shown in FIGS. 2A-2D, at least a portion of both first threaded end 150 and second threaded end 152 include external threads. First shaft element 124 and second shaft element 126 are oriented about central cavity 144, and central cavity 144 is defined by first internal surface 154 of first shaft element 124 and second internal surface 156 of second shaft element 126. Releasable constriction mechanism 120 is situated radially outward from first shaft element 124 and second shaft element 126 with respect to shaft axis X'-X'. Releasable expansion mechanism 122 is situated radially outward from releasable constriction mechanism 120 with respect to shaft axis X'-X'. In some examples, releasable constriction mechanism 120 can be one or more radial springs (such as radial springs 20 shown in FIGS. 1A-1E), and releasable expansion mechanism 122 can be one or more compression springs (such as compression spring 22 shown in FIGS. 1A-1E).

Cap 112 can be configured to move axially along shaft axis X'-X', and can be configured to engage first cap end 136 and second cap end 138. Housing 114 can be configured to receive cap 112 through cap opening 134. Cap 112 and housing 114 can be configured to be actuated by hand and/or with tools such as pliers. In particular, cap 112 and housing 114 can be configured to be actuated by a deco-style plier which can interface with housing lip 158 and closed end 128 of cap 112 to depress cap 112 into housing 114. Tapered sections 146 of internal alignment shaft 116 guide the lateral movement of first shaft element 124 and second shaft element 126 relative to central body 142 of internal alignment shaft 116. Radial springs 120 can be configured to constrict about first shaft element 124 and second shaft element 126 such that first shaft element 124 and second shaft element 126 move laterally inward toward central body 142 of internal alignment shaft 116. Compression spring 122 can be configured to allow first shaft element 124 and second shaft element 126 to move laterally outward away from central body 142 of internal alignment shaft 116. In this manner, fastener 110 can operate in substantially the same manner as fastener 10 (described above with respect to FIGS. 1A-1E).

In step 202, cap 112 is depressed as shown in FIGS. 2A-2B. The depression of cap 112 translates cap 112 along shaft axis X'-X'. The depression of cap 112 causes cap 112 to encounter and engage first cap end 136 of first shaft element 124 and second cap end 138 of second shaft element 126. The depression of cap 112 can be performed by a user directly (for example, by hand-depressing the cap using a portion of the user's hand, such as one or more fingers) or through the use of a tool such as a deco-style plier.

In step 204, first shaft element 124 and second shaft element 126 move along tapered section 146 of internal alignment shaft 116, as shown in FIGS. 2A-2B. Tapered section 146 guide the movement of first shaft element 124 and second shaft element 126 both laterally and axially relative to internal alignment shaft 116 with respect to shaft axis X'-X'.

In step 206, releasable constriction mechanism 120 constricts first shaft element 124 and second shaft element 126 as shown in FIGS. 2A-2B. This constriction causes the lateral inward movement (that is, laterally inward toward internal alignment shaft 116 which extends along shaft axis X'-X') of first shaft element 124 and second shaft element 126. As described above in step 204, tapered section 146 guide the movement of first shaft element 124 and second shaft element 126. Steps 204 and 206 can occur approximately simultaneously. Releasable constriction mechanism 120 can be one or more radial springs, such as radial springs 20 (shown in FIGS. 1A-1E).

In step 208, first threaded end 150 of first shaft element 124 and second threaded end 152 of second shaft element 126 are inserted through first opening 104 of first workpiece 102 and subsequently into second opening 108 of second workpiece 106, as shown in FIG. 2B. First opening 104 is aligned with second opening 108 such that first opening 104 and second opening 108 are oriented along a common axis, which can align with shaft axis X'-X'. Due to the lateral inward movement of first shaft element 124 and second shaft element 126 in steps 204-206, the major diameter D extending from first external surface 160 of first threaded end 150 to second external surface 162 of second threaded end 152 decreases, allowing first threaded end 150 and second threaded end 152 to be inserted through first opening 104 and into second opening 108. Major diameter D increases or decreases at a uniform rate across first shaft element 124 and second shaft element 126.

In step 210, cap 112 is released, as shown in FIGS. 2C-2D. The release of cap 112 causes the movement of cap 112 along shaft axis X'-X' in the opposite direction of the depression of cap 112 in step 202. The release of cap 112 causes cap 112 to disengage first cap end 136 of first shaft element 124 and second cap end 138 of second shaft element 126. The release of cap 112 can be performed by a user releasing pressure on cap 112 directly or by releasing a tool used to depress cap 112.

In step 212, releasable expansion mechanism 122 allows first shaft element 124 and second shaft element 126 to move laterally apart from each other, as shown in FIG. 2D. As described above in steps 204-206, the profile of tapered section 146 guides the lateral outward movement of first shaft element 124 and second shaft element 126. Releasable expansion mechanism 122 can be one or more compression springs, such as compression spring 22 (shown in FIGS. 1A-1E).

In step 214, first threaded end 150 and second threaded end 152 engage threads 164 within second opening 108. This allows fastener 110 to be secured within first opening 104 and second opening 108, thereby fastening first workpiece 102 to second workpiece 106. Steps 212 and 214 can occur approximately simultaneously. First opening 104 can, in some examples, also include threads. In some examples, step 214 can include locking fastener 110 with a locking mechanism (such as locking mechanisms 428, 522 shown in FIGS. 5A-6E). This locking mechanism can be, for example, a thumbscrew or a hex nut. Locking the fastener can be achieved by tightening the locking mechanism with a threaded cap opening disposed in the cap such that the locking mechanism abuts the internal alignment shaft. Tightening the locking mechanism can be performed through hand-tightening.

Method 200 can, in some examples, include additional steps. For example, method 200 can include locking fastener 110 as described above in step 214, depressing cap 112 to disengage threads 164 within second opening 108, and/or removing fastener 110 from first opening 104 and second opening 108 after disengaging threads 164 within second opening 108.

Figure 4:
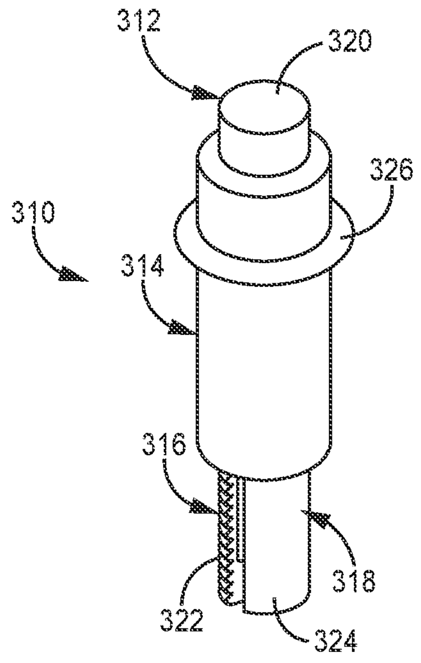
FIG. 4 is a perspective view of a fastener with threaded and unthreaded shaft elements.

FIG. 4 is a perspective view of fastener 310. Fastener 310 includes cap 312, housing 314, a threaded shaft section which includes threaded shaft element 316 and unthreaded shaft element 318, closed end 320 of cap 312, threaded end 322 of threaded shaft element 316, unthreaded end 324 of unthreaded shaft element 318, and housing lip 326 of housing 314. Fastener 310 can also include an internal alignment shaft having one or more tapered sections (such as internal alignment shaft 16 shown in FIG. 1A), one or more radial springs (such as radial springs 20 shown in FIG. 1A), one or more compression springs (such as compression spring 22 shown in FIG. 1A), and additional threaded or unthreaded shaft elements.

Fastener 310 can function in substantially the same manner as fasteners 10, 110 described above in reference to FIGS. 1A-2D. Unthreaded shaft element 318 can be a component having approximately the same shape as threaded shaft element 316. Unthreaded shaft element 318 moves in the same manner as threaded shaft element 316 (and in a similar manner to first shaft element 124 and second shaft element 126, described above in reference to FIGS. 1A-2D) due to the interaction between cap 312, unthreaded shaft element 318, and the tapered section(s) of the internal alignment shaft (not shown in FIG. 4). Unthreaded end 324 of unthreaded shaft element 318 can contact threads within an opening but will not engage the threads.

Figure 5A:
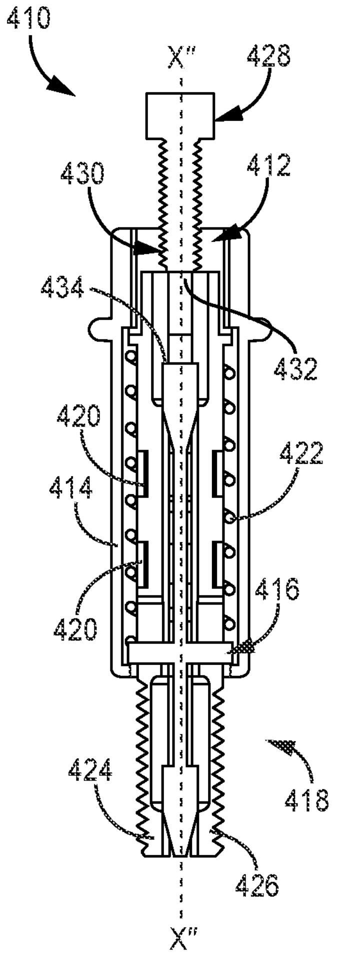
FIG. 5A is a cross-sectional view of a fastener with an open locking mechanism.
Figure 5B:
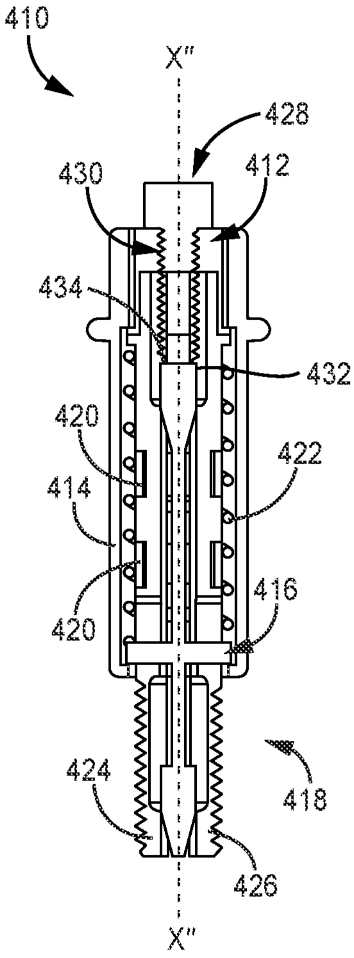
FIG. 5B is a cross-sectional view of the fastener of FIG. 5A with the locking mechanism locked.
Figure 5C:
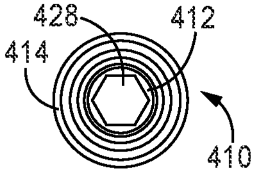
FIG. 5C is a top plan view of the fastener of FIG. 5A.

FIG. 5A is a cross-sectional view of fastener 410. Fastener 410 includes cap 412, housing 414, internal alignment shaft 416, threaded shaft section 418, releasable constriction mechanism 420, releasable expansion mechanism 422, first shaft element 424 and second shaft element 426 within threaded shaft section 418, locking mechanism 428, and threaded cap opening 430 within cap 412. FIG. 5B is a cross-sectional view of fastener 410 with locking mechanism 428 locked. FIG. 5C is a top plan view of fastener 410. FIGS. 5A-5C will be discussed concurrently below.

Fastener 410 can function in substantially the same manner as fasteners 10, 110 described above in reference to FIGS. 1A-2D with respect to the fastening of workpieces (e.g., cap 412, housing 414, internal alignment shaft 416, threaded shaft section 418, releasable constriction mechanism 420, releasable expansion mechanism 422, first shaft element 424, and second shaft element 426 operate in substantially the same manner as their corresponding components in fasteners 10, 110).

In the example shown in FIGS. 5A-5C, locking mechanism 428 is a hex nut which is rotatably insertable into fastener 410 through cap 412 via threaded cap opening 430. In the example shown in FIGS. 5A-5C, threaded cap opening 430 is centered within cap 412. Locking mechanism 428 can be rotated by a user (either manually or automatically, and through hand-tightening or with a suitable tool) through cap 412 such that locking mechanism 428 moves axially along axis X"—X". When locking mechanism 428 is positioned as shown in FIG. 5A, fastener 410 is unlocked and cap 412 can be either depressed or released. When locking mechanism 428 is positioned as shown in FIG. 5B (with end 432 of locking mechanism 428 directly abutting end 434 of internal alignment shaft 416), fastener 410 is locked and cap 412 will remain depressed until locking mechanism 428 is sufficiently loosened. In this manner, locking mechanism 428 is captive within cap 412 and torques against internal alignment shaft 416 to prevent any depression and/or activation of internal alignment shaft 416 (and, accordingly, prevents movement of fastener 410 within a threaded opening). In some examples, a locking mechanism can replace the cap, or the locking mechanism and cap can be incorporated into a unitary component. In these examples, tightening the locking mechanism can both depress the cap (or cap replacement) and lock the fastener.

Figure 6A:
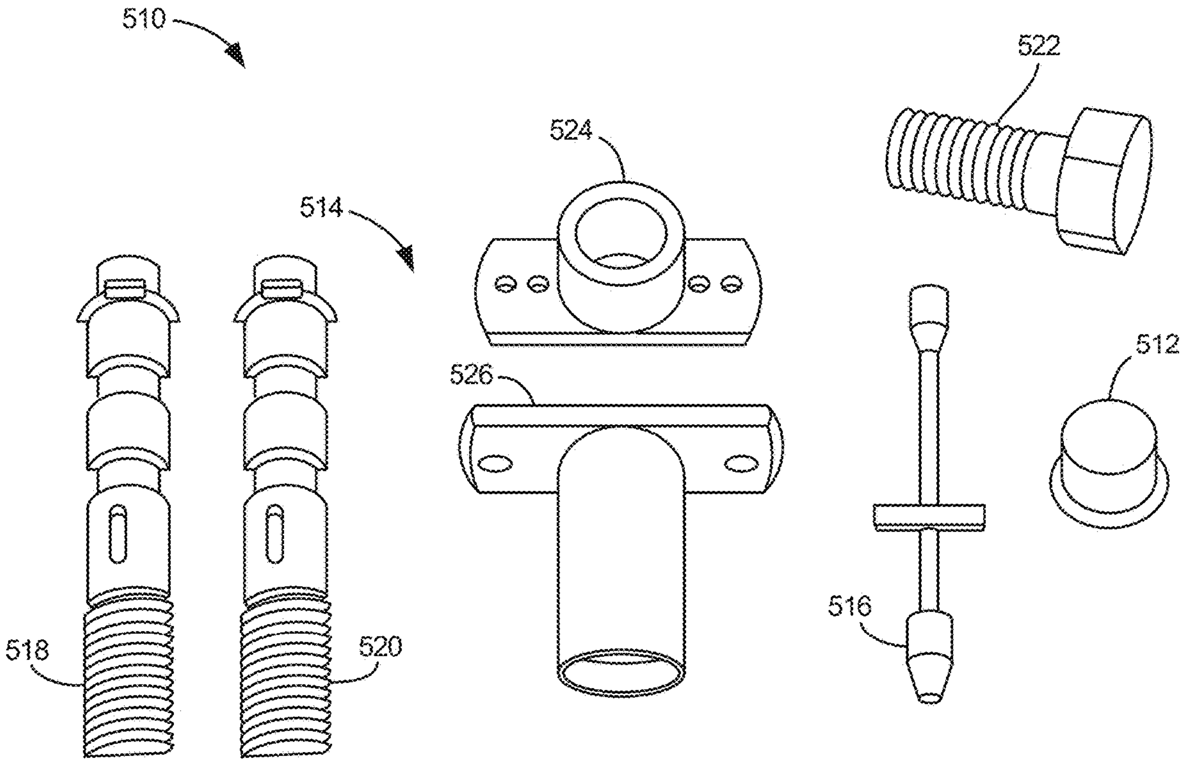
FIGS. 6A-6B are perspective views of components of a fastener with a locking mechanism and a grip housing.
Figure 6B:
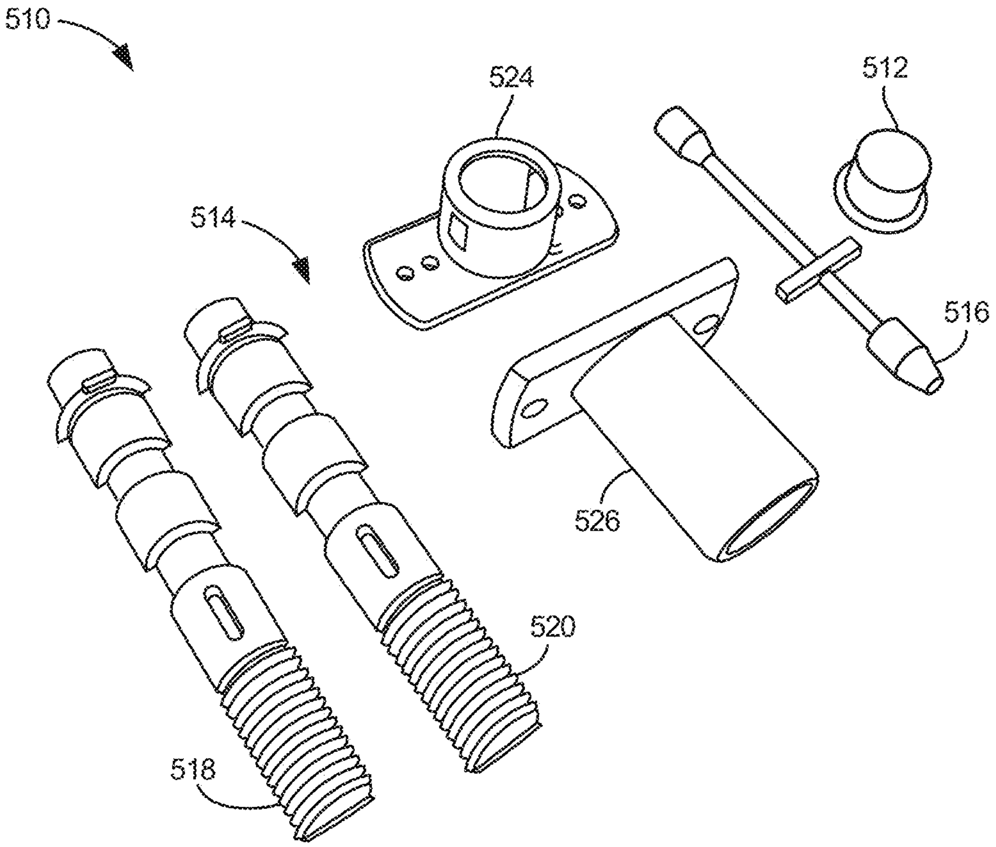
Figure 6C:
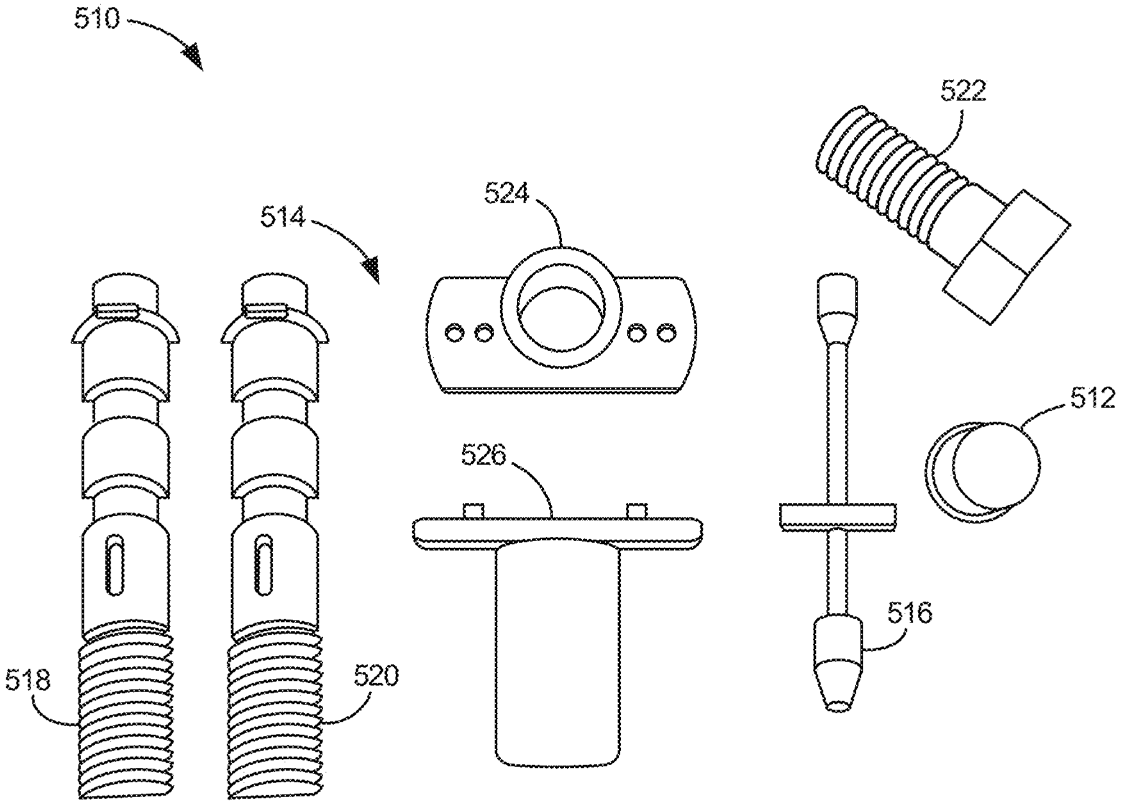
FIG. 6C is a top plan view of the components of FIGS. 6A-6B.
Figure 6D:
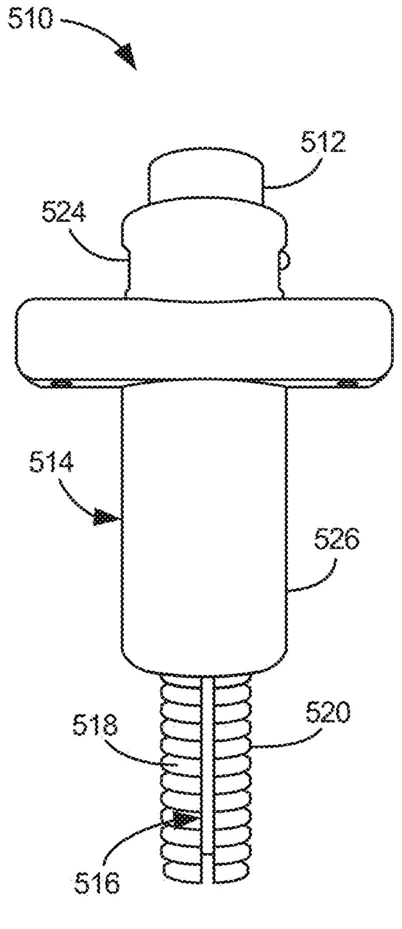
FIGS. 6D-6E are side views of the assembled components of FIGS. 6A-6B.
Figure 6E:
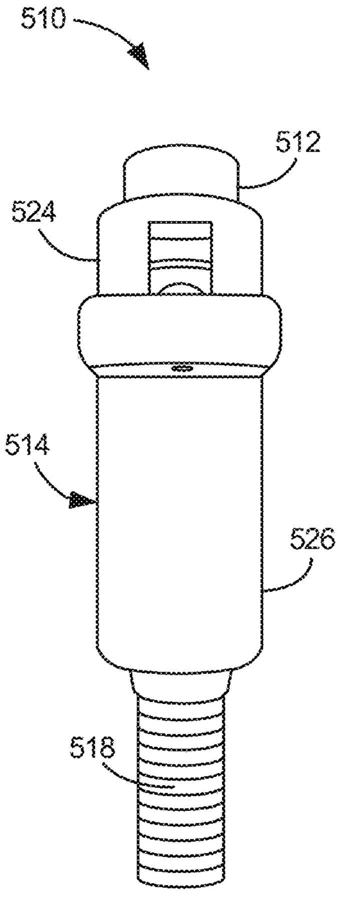

FIGS. 6A-6B are perspective views of fastener 510 separated into components. Fastener 510 includes cap 512, housing 514, internal alignment shaft 516, first shaft element 518, second shaft element 520, locking mechanism 522, first housing component 524, and second housing component 526. Fastener 510 can also include one or more radial springs (such as radial springs 20 shown in FIG. 1A), as well as one or more compression springs (such as compression spring 22 shown in FIG. 1A). FIG. 6C is a top plan view of the components of fastener 510. FIGS. 6D-6E are side views of fastener 510 once assembled. FIGS. 6A-6E will be discussed concurrently below.

Fastener 510 can function in substantially the same manner as fasteners 10, 110, 410 described above in reference to FIGS. 1A-2D and 5A-5C with respect to the fastening of workpieces (e.g., cap 512, housing 514, internal alignment shaft 516, first shaft element 518, and second shaft element 520 operate in substantially the same manner as their corresponding components in fasteners 10, 110, 410). Further, locking mechanism 522 can function in substantially the same manner as locking mechanism 428 (described above in reference to FIGS. 5A-5C). In the example shown in FIGS. 6A-6E, locking mechanism 522 can replace cap 512. In these examples, tightening locking mechanism 522 can both depress internal alignment shaft 516 and lock fastener 510. First housing component 524 and second housing component 526, when assembled, can form housing 514. First housing component 524 and second housing component 526 can be joined with bolts, snaps, or other suitable connections.

In some examples, fasteners 10, 110, 310, 410, 510 can include one or more threaded shaft elements and/or one or more unthreaded shaft elements. The unthreaded shaft elements can be situated between threaded shaft elements in a repeating or non-repeating pattern. The shaft elements can all be the same size (for example, three shaft elements each making up approximately one third of a cylinder) or can have varying sizes relative to the other shaft elements.

A fastener as described herein provides numerous advantages. A fastener with a uniformly expanding diameter along the length of its shaft ends does not require the opening to be designed for the fastener (for example, if the fastener is being used temporarily). This fastener design is thereby compatible with various openings, such as threaded blind holes, threaded through holes, countersink holes, counterbore holes, and spot face holes. Additionally, this fastener design can be used with locking threaded inserts (such as Heli-Coil® or Keensert® inserts) without wearing out the locking feature. A fastener which does not require rotation to be inserted into a threaded opening prevents wear on the threads of both the opening and the fastener, and maintains alignments of the workpieces. Finally, this fastener can be actuated in various ways to provide greater adaptability during use.

DISCUSSION OF POSSIBLE EMBODIMENTS

The following are non-exclusive descriptions of possible embodiments of the present invention.

A fastener for engaging a threaded opening includes first and second shaft elements, an internal alignment shaft, a releasable constriction mechanism, a releasable expansion mechanism, and a cap. The first shaft element extends along a shaft axis from a first cap end to a first shaft end and has a partially cylindrical shape. The second shaft element extends along the shaft axis from a second cap end to a second shaft end and has a partially cylindrical shape. The second shaft element is disposed alongside and parallel the first shaft element. The internal alignment shaft extends along the shaft axis and is surrounded by a central cavity. The first shaft element and the second shaft element are oriented about the central cavity and the central cavity is defined by a first internal surface of the first shaft element and a second internal surface of the second shaft element. The releasable constriction mechanism is configured to constrict about the first shaft element and the second shaft element such that the first shaft element and the second shaft element move laterally inward toward the internal alignment shaft. The releasable expansion mechanism is configured to allow the first shaft element and the second shaft element to move laterally outward away from the internal alignment shaft. The cap is configured to move axially along the shaft axis, and is configured to engage the first cap end of the first shaft element and the second cap end of the second shaft element such that the first shaft element and the second shaft element move axially relative to the internal alignment shaft. At least a portion of at least one of the first shaft end and the second shaft end comprises external threads.

The fastener of the preceding paragraph can optionally include, additionally and/or alternatively, any one or more of the following features, configurations and/or additional components:

A fastener for engaging a threaded opening according to an exemplary embodiment of the present invention, among other possible things, includes first and second shaft elements, an internal alignment shaft, a releasable constriction mechanism, a releasable expansion mechanism, and a cap. The first shaft element extends along a shaft axis from a first cap end to a first shaft end and has a partially cylindrical shape. The second shaft element extends along the shaft axis from a second cap end to a second shaft end and has a partially cylindrical shape. The second shaft element is disposed alongside and parallel the first shaft element. The internal alignment shaft extends along the shaft axis and is surrounded by a central cavity. The first shaft element and the second shaft element are oriented about the central cavity and the central cavity is defined by a first internal surface of the first shaft element and a second internal surface of the second shaft element. The releasable constriction mechanism is configured to constrict about the first shaft element and the second shaft element such that the first shaft element and the second shaft element move laterally inward toward the internal alignment shaft. The releasable expansion mechanism is configured to allow the first shaft element and the second shaft element to move laterally outward away from the internal alignment shaft. The cap is configured to move axially along the shaft axis, and is configured to engage the first cap end of the first shaft element and the second cap end of the second shaft element such that the first shaft element and the second shaft element move axially relative to the internal alignment shaft. At least a portion of at least one of the first shaft end and the second shaft end comprises external threads.

A further embodiment of the foregoing fastener, wherein the internal alignment shaft comprises two tapered sections oriented along a central body of the internal alignment shaft and which guide the lateral movement of the first shaft element and the second shaft element relative to the internal alignment shaft.

A further embodiment of any of the foregoing fasteners, wherein the two tapered sections are approximately conical in shape.

A further embodiment of any of the foregoing fasteners, wherein the internal alignment shaft further comprises a cross bar oriented perpendicular to the central body and which is configured to axially and laterally engage the first shaft element and the second shaft element via a first slot in the first shaft element and a second slot in the second shaft element.

A further embodiment of any of the foregoing fasteners, further comprising a housing which surrounds the first cap end and the second cap end, extends along the shaft axis to the first shaft end and the second shaft end, and is configured to receive the cap.

A further embodiment of any of the foregoing fasteners, wherein the cap and the housing are configured to be actuated with pliers.

A further embodiment of any of the foregoing fasteners, wherein the first shaft end comprises a threaded section and the second shaft end comprises an unthreaded section.

A further embodiment of any of the foregoing fasteners, further comprising a locking mechanism.

A further embodiment of any of the foregoing fasteners, wherein the locking mechanism comprises one of: a thumb-screw and a hex nut.

A further embodiment of any of the foregoing fasteners, wherein the releasable constriction mechanism comprises one or more radial springs situated radially outward from the first shaft element and the second shaft element with respect to the shaft axis, and the releasable expansion mechanism comprises one or more compression springs situated radially outward from the one or more radial springs with respect to the shaft axis.

A further embodiment of any of the foregoing fasteners, wherein the fastener is configured to be hand actuated.

A fastener for engaging a threaded opening includes first and second shaft elements, an internal alignment shaft, at least one radial spring, at least one compression spring, a cap, and a housing. The first shaft element extends along a shaft axis from a first cap end to a first threaded end and has a partially cylindrical shape. At least a portion of the first threaded end comprises external threads. The second shaft element extends along the shaft axis from a second cap end to a second threaded end and has a partially cylindrical shape. At least a portion of the second threaded end comprises external threads. The second shaft element is disposed alongside and parallel the first shaft element. The internal alignment shaft extends along the shaft axis and is surrounded by a central cavity. The first shaft element and the second shaft element are oriented about the central cavity and the central cavity is defined by a first internal surface of the first shaft element and a second internal surface of the second shaft element. The at least one radial spring is configured to constrict about the first shaft element and the second shaft element such that the first shaft element and the second shaft element move laterally inward toward the internal alignment shaft. The at least one compression spring is configured to allow the first shaft element and the second shaft element to move laterally outward away from the internal alignment shaft. The cap is configured to move axially along the shaft axis, and is configured to engage the first cap end of the first shaft element and the second cap end of the second shaft element such that the first shaft element and the second shaft element move axially relative to the internal alignment shaft. The housing surrounds the first cap end and the second cap end, extends along the shaft axis to the first threaded end and the second threaded end, and is configured to receive the cap.

The fastener of the preceding paragraph can optionally include, additionally and/or alternatively, any one or more of the following features, configurations and/or additional components:

A fastener for engaging a threaded opening according to an exemplary embodiment of the present invention, among other possible things, includes first and second shaft elements, an internal alignment shaft, at least one radial spring, at least one compression spring, a cap, and a housing. The first shaft element extends along a shaft axis from a first cap end to a first threaded end and has a partially cylindrical shape. At least a portion of the first threaded end comprises external threads. The second shaft element extends along the shaft axis from a second cap end to a second threaded end and has a partially cylindrical shape. At least a portion of the second threaded end comprises external threads. The second shaft element is disposed alongside and parallel the first shaft element. The internal alignment shaft extends along the shaft axis and is surrounded by a central cavity. The first shaft element and the second shaft element are oriented about the central cavity and the central cavity is defined by a first internal surface of the first shaft element and a second internal surface of the second shaft element. The at least one radial spring is configured to constrict about the first shaft element and the second shaft element such that the first shaft element and the second shaft element move laterally inward toward the internal alignment shaft. The at least one compression spring is configured to allow the first shaft element and the second shaft element to move laterally outward away from the internal alignment shaft. The cap is configured to move axially along the shaft axis, and is configured to engage the first cap end of the first shaft element and the second cap end of the second shaft element such that the first shaft element and the second shaft element move axially relative to the internal alignment shaft. The housing surrounds the first cap end and the second cap end, extends along the shaft axis to the first threaded end and the second threaded end, and is configured to receive the cap.

A method of fastening a first workpiece to a second workpiece includes depressing a cap of a fastener, thereby engaging a first cap end of a first shaft element of the fastener and a second cap end of a second shaft element of the fastener. The first shaft element extends from the first cap end to a first shaft end and has a partially cylindrical shape. The second shaft element extends from the second cap end to a second shaft end and has a partially cylindrical shape, and is disposed alongside and parallel the first shaft element. At least a portion of at least one of the first shaft end and the second shaft end comprise external threads. The first shaft element and the second shaft element move along tapered sections of an internal alignment shaft of the fastener. The tapered sections guide the movement of the first shaft element and the second shaft element both laterally and axially relative to the internal alignment shaft with respect to a shaft axis along which the first shaft element, the second shaft element, and the internal alignment shaft extend. A releasable constriction mechanism constricts the first shaft element and the second shaft element such that the first shaft element and the second shaft element move laterally inward toward the internal alignment shaft, guided by the tapered sections of the internal alignment shaft. The first shaft end and the second shaft end are inserted through a first opening of the first workpiece and into a second opening of the second workpiece which is situated adjacent to the first opening. The cap is released, thereby disengaging the first cap end and the second cap end. A releasable expansion mechanism allows the first shaft element to move laterally apart from the second shaft element guided by the tapered sections of the internal alignment shaft. The at least a portion of at least one of the first shaft end and the second shaft end comprising external threads engages threads within the second opening.

The method of the preceding paragraph can optionally include, additionally and/or alternatively, any one or more of the following features, configurations and/or additional components:

A method of fastening a first workpiece to a second workpiece according to an exemplary embodiment of the present invention, among other possible things, includes depressing a cap of a fastener, thereby engaging a first cap end of a first shaft element of the fastener and a second cap end of a second shaft element of the fastener. The first shaft element extends from the first cap end to a first shaft end and has a partially cylindrical shape. The second shaft element extends from the second cap end to a second shaft end and has a partially cylindrical shape, and is disposed alongside and parallel the first shaft element. At least a portion of at least one of the first shaft end and the second shaft end comprise external threads. The first shaft element and the second shaft element move along tapered sections of an internal alignment shaft of the fastener. The tapered sections guide the movement of the first shaft element and the second shaft element both laterally and axially relative to the internal alignment shaft with respect to a shaft axis along which the first shaft element, the second shaft element, and the internal alignment shaft extend. A releasable constriction mechanism constricts the first shaft element and the second shaft element such that the first shaft element and the second shaft element move laterally inward toward the internal alignment shaft, guided by the tapered sections of the internal alignment shaft. The first shaft end and the second shaft end are inserted through a first opening of the first workpiece and into a second opening of the second workpiece which is situated adjacent to the first opening. The cap is released, thereby disengaging the first cap end and the second cap end. A releasable expansion mechanism allows the first shaft element to move laterally apart from the second shaft element guided by the tapered sections of the internal alignment shaft. The at least a portion of at least one of the first shaft end and the second shaft end comprising external threads engages threads within the second opening.

A further embodiment of the foregoing method, further comprising locking the fastener within the first opening and the second opening with a locking mechanism.

A further embodiment of any of the foregoing methods, wherein the locking mechanism is a hex nut and locking the fastener comprises tightening the locking mechanism with a threaded cap opening disposed in the cap such that the locking mechanism abuts the internal alignment shaft.

A further embodiment of any of the foregoing methods, wherein tightening the locking mechanism comprises hand-tightening the locking mechanism.

A further embodiment of any of the foregoing methods, wherein depressing the cap of the fastener comprises depressing the cap with a deco-style plier.

A further embodiment of any of the foregoing methods, wherein depressing the cap of the fastener comprises hand-depressing the cap.

A further embodiment of any of the foregoing methods, further comprising depressing the cap of the fastener to disengage the threads within the second opening.

A further embodiment of any of the foregoing methods, further comprising removing the fastener from the first opening and the second opening.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fastener for engaging a threaded opening, the fastener comprising:

a first shaft element extending along a shaft axis from a first cap end to a first shaft end and having a partially cylindrical shape;

a second shaft element extending along the shaft axis from a second cap end to a second shaft end and having a partially cylindrical shape, the second shaft element disposed alongside and parallel the first shaft element;

an internal alignment shaft extending along the shaft axis and surrounded by a central cavity, wherein the first shaft element and the second shaft element are oriented about the central cavity and the central cavity is defined by a first internal surface of the first shaft element and a second internal surface of the second shaft element, the internal alignment shaft comprising two tapered sections oriented along and extending radially outward from a central body of the internal alignment shaft and which guide a lateral movement of the first shaft element and the second shaft element relative to the internal alignment shaft, the two tapered sections separated axially by a cylindrical portion of the central body having a radial width extending symmetrically radially outward from the shaft axis, wherein the radial width of the cylindrical portion of the central body is narrower than a radial width of a first tapered section of the two tapered sections and a radial width of a second tapered section of the two tapered sections, the first tapered section and the second tapered section each being laterally wider than the central body and widest nearest the first cap end and laterally narrowest nearest the first shaft end, wherein the first and second shaft elements are axially translatable relative to the internal alignment shaft between:

a retracted position wherein the first and second shaft elements are axially retracted toward the first cap end and forced laterally apart by the two tapered sections; and an extended position wherein the first and second shaft elements are extended axially beyond an axial extent of the internal alignment shaft and not forced laterally apart by either of the two tapered sections;

a releasable constriction mechanism configured to constrict about the first shaft element and the second shaft element, and sufficient to move the first shaft element and the second shaft element laterally inward toward the internal alignment shaft when the first and second shaft elements are in the extended position;

a releasable expansion mechanism configured to allow the first shaft element and the second shaft element to move laterally outward away from the internal alignment shaft; and a cap configured to move axially along the shaft axis, and further configured to engage the first cap end of the first shaft element and the second cap end of the second shaft element such that the first shaft element and the second shaft element move axially relative to the internal alignment shaft;

wherein a portion of the first shaft end and/or the second shaft end comprises external threads;

wherein the first tapered section of the two tapered sections is situated coaxially within the releasable expansion mechanism and proximate the releasable constriction mechanism without axially overlapping the external threads of the first shaft end and/or the second shaft end, while the second tapered section of the two tapered sections axially overlaps the external threads of the first shaft end and/or the second shaft end; and wherein the releasable expansion mechanism is sufficient to move the first and second shaft elements from the extended position to the retracted position, absent an outside force on the cap.

2. The fastener of claim 1, wherein the two tapered sections are approximately conical in shape.

3. The fastener of claim 1, wherein the internal alignment shaft further comprises a cross bar oriented perpendicular to the central body and situated axially between the two tapered sections, and which is configured to axially and laterally engage the first shaft element and the second shaft element via a first slot in the first shaft element and a second slot in the second shaft element.

4. The fastener of claim 1, further comprising a housing which surrounds the first cap end and the second cap end, extends along the shaft axis to the first shaft end and the second shaft end, and is configured to receive the cap, wherein the internal alignment shaft is fixed relative to the housing and the first and second shaft elements are axially translatable relative to the housing, wherein the housing encloses one of the two tapered sections.

5. The fastener of claim 4, wherein the cap and the housing are configured to be actuated with pliers.

6. The fastener of claim 1, wherein the first shaft end comprises a threaded section and the second shaft end comprises an unthreaded section.

7. The fastener of claim 1, further comprising a locking mechanism.

8. The fastener of claim 7, wherein the locking mechanism comprises one of: a thumbscrew and a hex nut.

9. The fastener of claim 1, wherein the releasable constriction mechanism comprises one or more radial springs situated radially outward from the first shaft element and the second shaft element with respect to the shaft axis, and the releasable expansion mechanism comprises one or more compression springs situated radially outward from the one or more radial springs with respect to the shaft axis.

10. The fastener of claim 9, wherein the fastener is configured to be hand actuated.

11. A fastener for engaging a threaded opening, the fastener comprising:

a first shaft element extending along a shaft axis from a first cap end to a first threaded end and having a partially cylindrical shape, wherein at least a portion of the first threaded end comprises external threads;

a second shaft element extending along the shaft axis from a second cap end to a second threaded end and having a partially cylindrical shape, wherein at least a portion of the second threaded end comprises external threads, the second shaft element disposed alongside and parallel the first shaft element;

an internal alignment shaft extending along the shaft axis and surrounded by a central cavity, wherein the first shaft element and the second shaft element are oriented about the central cavity and the central cavity is defined by a first internal surface of the first shaft element and a second internal surface of the second shaft element, the internal alignment shaft comprising a first tapered section and a second tapered section oriented along and extending radially outward from a central body of the internal alignment shaft, the first tapered section and the second tapered section separated axially by a cylindrical portion of the central body having a radial width extending symmetrically radially outward from the shaft axis, wherein the radial width of the cylindrical portion of the central body is narrower than a radial width of the first tapered section and a radial width of the second tapered section the first tapered section and the second tapered section each being laterally wider than the central body and widest nearest the first cap end and laterally narrowest nearest the first threaded end;

at least one radial spring configured to constrict about the first shaft element and the second shaft element such that the first shaft element and the second shaft element move laterally inward toward the internal alignment shaft;

at least one compression spring configured to allow the first shaft element and the second shaft element to move laterally outward away from the internal alignment shaft;

a cap configured to move axially along the shaft axis, and further configured to engage the first cap end of the first shaft element and the second cap end of the second shaft element such that the first shaft element and the second shaft element move axially relative to the internal alignment shaft; and a housing which surrounds the first cap end, the second cap end, the first tapered section, and not the second tapered section, and extends along the shaft axis to an axial extent defined by a shaft opening disposed axially between the first tapered section and the external threads of the first threaded end and the external threads of the second threaded end, and is configured to receive the cap;

wherein the at least one radial spring and the at least one compression spring are situated within the housing; and wherein the first and second shaft elements are axially translatable relative to the internal alignment shaft between two positions:

a retracted state wherein the first and second shaft elements are axially retracted toward the first cap end and forced laterally apart by the first tapered section and the second tapered section; and an extended state wherein the first and second shaft elements are extended axially beyond an axial extent of the internal alignment shaft and not forced laterally apart by either of the first tapered section and the second tapered section.

12. A method of fastening a first workpiece to a second workpiece, the method comprising:

depressing a cap of a fastener, thereby engaging a first cap end of a first shaft element of the fastener and a second cap end of a second shaft element of the fastener, wherein:

the first shaft element extends from the first cap end to a first shaft end and has a partially cylindrical shape;

the second shaft element extends from the second cap end to a second shaft end and has a partially cylindrical shape, and is disposed alongside and parallel the first shaft element; and at least a portion of the first shaft end and/or the second shaft end comprises external threads;

moving the first shaft element and the second shaft element along a first tapered section and a second tapered section that each extend radially outward from a central body of an internal alignment shaft of the fastener and are widest at an axial end nearest the cap of the fastener, the first tapered section and the second tapered section separated axially by a cylindrical portion of the central body having a radial width extending symmetrically radially outward from a shaft axis, wherein the radial width of the cylindrical portion of the central body is narrower than a radial width of the first tapered section and a radial width of the second tapered section, wherein the first tapered section and the second tapered section guide movement of the first shaft element and the second shaft element both laterally and axially relative to the internal alignment shaft with respect to the shaft axis, and wherein the first shaft element, the second shaft element, and the internal alignment shaft extend along the shaft axis;

constricting, with a releasable constriction mechanism, the first shaft element and the second shaft element such that the first shaft element and the second shaft element move laterally inward toward the internal alignment shaft, guided by the first tapered section and the second tapered section of the internal alignment shaft;

inserting the first shaft end and the second shaft end through a first opening of the first workpiece and into a second opening of the second workpiece which is situated adjacent to the first opening;

releasing the cap, thereby disengaging the first cap end and the second cap end and causing a housing and the internal alignment shaft to move axially toward the first workpiece, relative to the first and second shaft elements;

allowing, with a releasable expansion mechanism, the first shaft element to be forced laterally apart from the second shaft element by the first tapered section and the second tapered section of the internal alignment shaft; and engaging threads within the second opening with the external threads of the first shaft end and/or the second shaft end;

wherein the first tapered section of the two tapered sections is situated coaxially within the releasable expansion mechanism and proximate the releasable constriction mechanism without axially overlapping the external threads of the first shaft end and/or the second shaft end, while the second tapered section of the two tapered sections axially overlaps the external threads of the first shaft end and/or the second shaft end.

13. The method of claim 12, further comprising locking the fastener within the first opening and the second opening with a locking mechanism.

14. The method of claim 13, wherein the locking mechanism is a hex nut and locking the fastener comprises tightening the locking mechanism with a threaded cap opening disposed in the cap such that the locking mechanism abuts the internal alignment shaft.

15. The method of claim 14, wherein tightening the locking mechanism comprises hand-tightening the locking mechanism.

16. The method of claim 12, wherein depressing the cap of the fastener comprises depressing the cap with a plier.

17. The method of claim 12, wherein depressing the cap of the fastener comprises hand-depressing the cap.

18. The method of claim 12, further comprising depressing the cap of the fastener to disengage the threads within the second opening.

19. The method of claim 12, further comprising removing the fastener from the first opening and the second opening.

* * * * *